No. 778,686. PATENTED DEC. 27, 1904.
M. LOEWENSTEIN.
CARBURETER.
APPLICATION FILED SEPT. 26, 1904.

Witnesses
Geo. H. Byrne.
W. May. Duvall.

Inventor
M. Loewenstein.
By Wilkinson & Fisher
Attorneys.

No. 778,686. Patented December 27, 1904.

UNITED STATES PATENT OFFICE.

MAXMILIAN LOEWENSTEIN, OF BRUSSELS, BELGIUM, ASSIGNOR OF TWO-THIRDS TO JONAS STORK, OF BRUSSELS, BELGIUM, AND MAURICE KIND, OF NEW YORK, N. Y.

CARBURETER.

SPECIFICATION forming part of Letters Patent No. 778,686, dated December 27, 1904.

Application filed September 26, 1904. Serial No. 226,083.

*To all whom it may concern:*

Be it known that I, MAXMILIAN LOEWENSTEIN, a subject of the Emperor of Germany, residing at Brussels, Kingdom of Belgium, have invented certain new and useful Improvements in Carbureters; and I do hereby declare the following to be a full, clear, and exact description of the invention, such as will enable others skilled in the art to which it appertains to make and use the same.

My invention relates to improvements in apparatus for producing carbureted air without heat; and the object of my invention is to produce a compact, cheap, and easily-operated apparatus whereby such product may be produced for illuminating and heating purposes or for running gas-engines of any size, whether stationary or movable. The smaller form of the apparatus designed for household use can be worked by hand, and all forms of the apparatus, whether large or small, can be worked by clockwork with an automatic arrangement, so that the rate of consumption will govern the rate of movement of the clock.

With this object in view my invention consists in the construction and combinations of parts, as hereinafter described and claimed.

Figure 1:
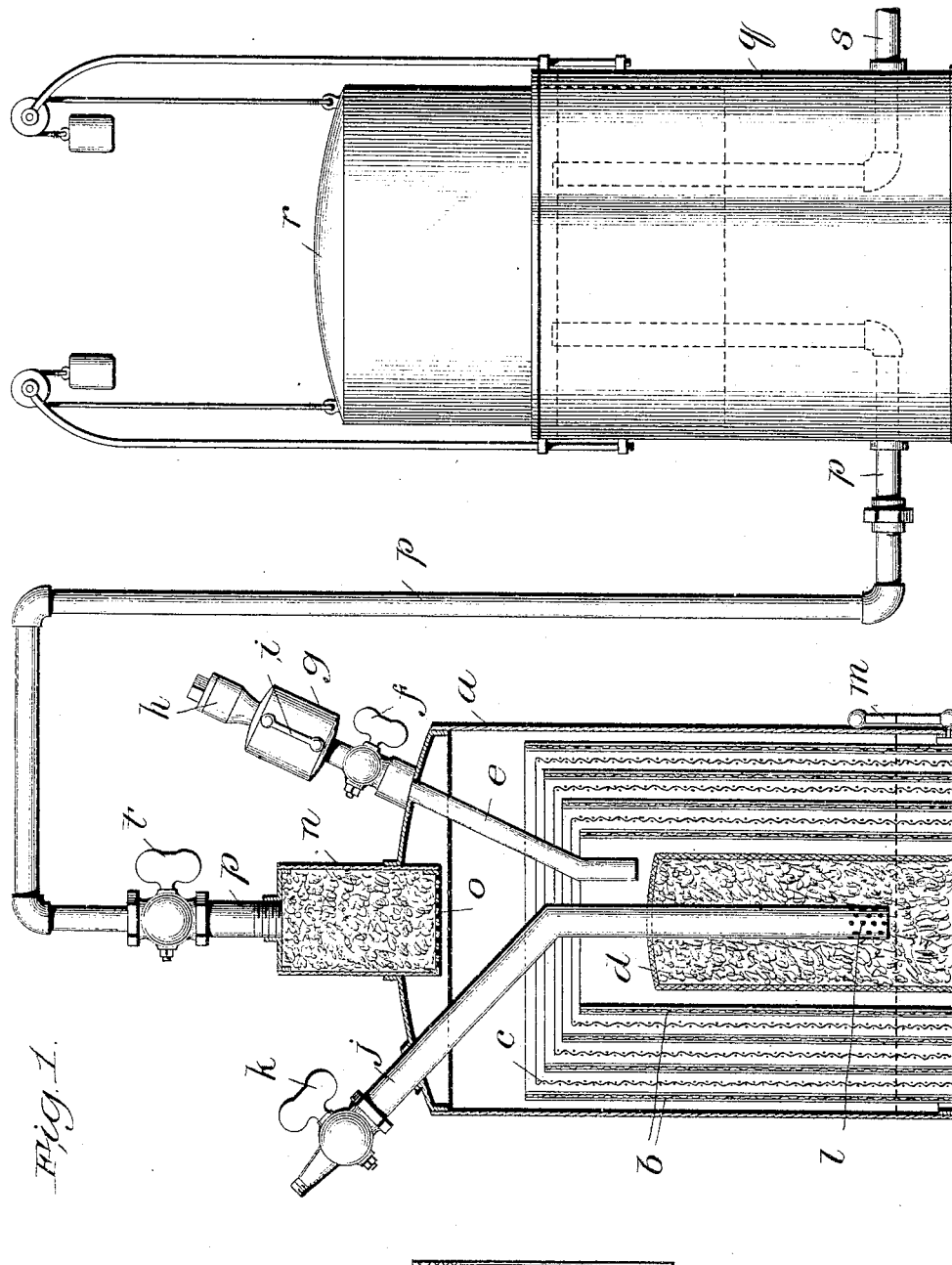
Figure 2:
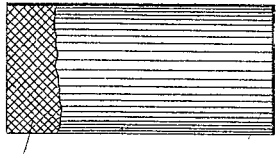

In the accompanying drawings, Figure 1 represents a longitudinal vertical section of my improved apparatus, the means for forcing air into the same not being shown; and Fig. 2 is a detail view showing the wick supported by a wire netting or screen.

In my apparatus the carbureted air is produced without the use of heat by the action of a current of air upon a liquid composed of the following substances—namely, naphtha, naphthalene, and ether—mixed together and forming a solution. The proportions I prefer to use are substantially as follows: Two hundred grams of naphthalene are mixed with one liter of naphtha, and to seven parts of this mixture, by volume, is added one part of ether and the whole thoroughly stirred, the result being a homogeneous liquid of high illuminating power, which at the same time can be easily volatilized. This liquid I have found by actual and long-continued trials to be admirably suited for the purposes designed. I do not restrict myself, however, to the specific proportions named, nor even to the specific ingredients named, as both might be varied considerably without departing from the spirit of my invention.

In the drawings, $a$ represents a tight casing, preferably of metal.

$b$ represents a coarse wire-netting covered with wicking or any other suitable pervious material, such as flannel, cloth, or similar substances. In fact, any absorbent pervious material can be used. This part $b$ is in the form of a cylinder open at both ends, with a strip of wicking or similar material wound continuously around it lengthwise like a bandage, whereby the wire-netting is entirely concealed, said wire-netting serving simply as a support. Of course the wicking may be supported on the netting in any suitable way. Instead of a wire-netting any sort of a metal or wooden frame might be used and the wicking or other absorbent material secured thereto in any desired manner. This hollow cylinder of netting covered with wicking usually rests loosely on the bottom of said casing; but, if desired, it can be fastened thereto in any suitable way. Within said hollow cylinder are a number of smaller hollow cylinders, similarly made and arranged concentrically within the first-named cylinder.

Of course it is not necessary that the parts $b$ should be exactly cylindrical in form; but in practice this is a convenient shape to use. I desire to cover in this application any shape of screen and any shape of outer casing, the shapes of the screen and outer casing being preferably, but not necessarily, the same.

Between the parts $b$ are preferably located screens $c$, made, for example, of wire-gauze. These are preferably made of the same shape as the parts $b$ and are introduced between them. I prefer to use these screens $c$ in order to always preserve a space between the parts $b$, so that two of said cylindrical parts can never be brought by accident closely together, thus impeding the passage of the air and gas. These screens $c$, however, are not strictly necessary and may be omitted, if desired. Instead of screens any kind of open frames either of metal or wood may be used.

Within the innermost part $b$ is left quite a large open space, in which is located a bag $d$, made of any suitable material, having its top closed and its bottom open and tightly packed with sponge or similar absorbent material. This bag may be made of any suitable substance, such as burlap or strong cloth not too closely woven; but in practice I have obtained excellent results from a bag made of wicks woven together.

$e$ represents a pipe passing in through the top of the casing, having its lower end open and preferably located above the bag $d$. Through this pipe the liquid already mentioned is introduced into the apparatus. Outside the casing this pipe is provided with a cock $f$ of any usual or desired construction and an enlargement $g$, into which a considerable portion of the liquid may be poured and kept ready for use. This enlarged portion or small storage-tank $g$ is adapted to be closed by a screw-cap $h$, by removing which the receptacle $g$ may be easily filled. Said receptacle $g$ is preferably provided with a gage-glass $i$, so that it may be readily determined how much liquid is contained in said receptacle. This receptacle need not be a part of the pipe $e$, but may be connected thereto by a pipe and located either above or below the casing $a$, the liquid being supplied to the casing in the latter event by pressure.

$j$ represents the pipe through which air is forced into the generator. This pipe is in practice connected with any suitable means, such as a fan driven by clockwork, (not shown,) for forcing air into the casing $a$. This pipe is provided with an ordinary cock $k$. Within the casing the pipe is bent, so as to pass downward nearly to the bottom of said casing, preferably at or near the center thereof. The lower end thereof is preferably open, and near the lower end it is provided with perforations $l$, or, if desired, the lower end of the pipe may be closed and provided with perforations like the perforations $l$.

The bag $d$, containing the sponges, fits closely around the pipe $j$ and its lower open end rests on the bottom of the casing $a$. The liquid supplied to the interior of the casing $a$ should never reach up to the bottom of the pipe, as this would cause the air passing through the liquid to produce bubbles, which is always detrimental to quick vaporization.

The casing $a$ is also provided with a gage-glass $m$, so that it may be readily determined how much liquid there is in said casing. If the lights begin to burn low, the operator looks at the apparatus and of course finds that the liquid of the casing $a$ is low. If the receptacle $g$ is full of liquid, the operator simply turns the cock $f$ and supplies additional liquid to the casing. If the liquid in the receptacle $g$ is low, this receptacle should be filled before the cock $f$ is opened. In this way a new supply of liquid can be introduced into the interior of the casing without turning off the lights or interfering in any way with the action of the apparatus and with perfect safety.

At the top of the casing $a$ is located an extension $n$, which may extend down a short distance into the casing and is packed with sponges or similar substances, said sponges being held in place by the perforated base-plate $o$. This acts as a filter and at the same time insures a thorough mixture of the air and volatilized liquid. This filter, however, is not strictly necessary, but may be omitted, if desired. To the extension $n$ is connected the delivery-pipe $p$, having a cock $t$. In the apparatus, as shown in the drawings, this delivery-pipe passes into a gasometer $q$, provided with the usual rising and falling bell $r$, $s$ representing the service-pipe passing out of said gasometer. For lighting on a large scale—as, for instance, a whole town or city—a gasometer would be necessary, as would also be the case if the gas is to be used with motors or machinery. On the other hand, for lighting a single house a gasometer would not be necessary; but the service-pipe $p$ might be connected directly to the gas-meter, from which it would be delivered to the house or service pipe.

The advantages of my apparatus are that it is small, cheap, and portable, (unless used on a large scale.) Furthermore, a decided advantage is that the product is practically odorless and not harmful to life, so that if it escapes into a room there is practically no danger of explosion or of asphyxiation if any person or animal happens to be in the room.

Having thus described my invention, what I claim as new, and desire to secure by Letters Patent of the United States, is—

1. In a carbureter, the combination of a casing, an air-pipe entering said casing, a receptacle closely surrounding the lower part of said air-pipe, said receptacle being composed of pervious material and being tightly packed with sponges or similar substances, a pipe for supplying liquid to the interior of said casing, and one or more wicks surrounding said pervious receptacle but separated therefrom by a considerable space, substantially as described.

2. In a carbureter, the combination of a casing, an air-pipe entering said casing and having its lower part perforated, a receptacle tightly surrounding the lower part of said pipe, said receptacle being composed of pervious material, sponges or similar materials tightly packed in said receptacle and filling the same, a pipe for supplying liquid to the interior of said casing, and a series of wicks concentrically arranged around said receptacle but separated therefrom by a considerable space, substantially as described.

3. In a carbureter, the combination of a casing, an air-pipe delivering into said casing, the lower part of said air-pipe being perforated, a receptacle closely surrounding the lower part of said air-pipe, said receptacle being composed of pervious material and being tightly packed with sponges or similar materials, a series of wicks concentrically arranged and surrounding said receptacle but separated therefrom by a considerable space, a series of screens or frames located between said wicks respectively, and a pipe for supplying liquid to the interior of said casing, said pipe being adapted to deliver the liquid upon the top of said pervious receptacle, substantially as described.

4. In a carbureter, the combination of a casing, an air-supply pipe leading into said casing, a liquid-supply pipe also leading into said casing and provided with a cock, a receptacle and a screw-cap, a receptacle having pervious walls surrounding the lower end of said air-pipe and tightly packed with sponges or similar materials, and a series of wicks concentrically arranged and surrounding said pervious receptacle but separated therefrom by a considerable space, substantially as described.

5. In a carbureter, the combination of a casing, air and liquid supply pipes delivering into said casing, a receptacle having pervious walls closely surrounding the lower end of said air-supply pipe, said receptacle being tightly packed with sponges or similar materials, a series of wicks arranged concentrically around said receptacle but separated therefrom by a considerable space, a service-pipe and a sponge-packed filter and mixer provided with a perforated base located between said casing and said service-pipe, substantially as described.

6. In a carbureter, the combination of a casing, a valved air-supply pipe leading into said casing, a liquid-supply pipe leading into said casing and provided with a cock, a supply-tank and a screw-cap, a receptacle having pervious walls closely surrounding the lower end of said air-pipe and tightly packed with sponges or similar materials, a series of wicks concentrically arranged around said receptacle but separated therefrom by a considerable space, supports for said wicks, a series of screens or frames concentrically arranged located between said wicks, a filter, a gasometer, and connecting and service pipes, substantially as described.

In testimony whereof I affix my signature in presence of two witnesses.

MAXMILIAN LOEWENSTEIN.

Witnesses:
JOHN STEPHEN GIUSTA,
W. MAX. DUVALL.